(12) United States Patent
Chowdhury et al.

(10) Patent No.: US 10,069,602 B2
(45) Date of Patent: Sep. 4, 2018

(54) TRANSMISSION CONTROL PROTOCOL PROXY IN LONG TERM EVOLUTION RADIO ACCESS NETWORK

(71) Applicant: Altiostar Networks, Inc., Tewksbury, MA (US)

(72) Inventors: Kuntal Chowdhury, Andover, MA (US); Ashraf M. Dahod, Andover, MA (US)

(73) Assignee: AltioStar Networks, Inc., Tewksbury, MA (US)

( * ) Notice: Subject to any disclaimer, the term of this patent is extended or adjusted under 35 U.S.C. 154(b) by 93 days.

(21) Appl. No.: 14/225,022

(22) Filed: Mar. 25, 2014

(65) Prior Publication Data

US 2014/0286239 A1 Sep. 25, 2014

Related U.S. Application Data

(60) Provisional application No. 61/804,991, filed on Mar. 25, 2013, provisional application No. 61/804,893,
(Continued)

(51) Int. Cl.
*H04L 1/18* (2006.01)
*H04L 29/06* (2006.01)
(Continued)

(52) U.S. Cl.
CPC ............ *H04L 1/1812* (2013.01); *H04L 1/188* (2013.01); *H04L 1/1854* (2013.01);
(Continued)

(58) Field of Classification Search
CPC ..... H04L 1/1812; H04L 1/1854; H04L 1/188; H04L 1/1887; H04L 47/193; H04L 47/40;
(Continued)

(56) References Cited

U.S. PATENT DOCUMENTS 5,473,602 A * 12/1995 McKenna ............ H04W 40/24
370/256
8,531,947 B2 9/2013 Zhao et al.
(Continued)

FOREIGN PATENT DOCUMENTS

EP 2 200 390 A2 6/2010
EP 2 501 141 A2 9/2012
(Continued)

OTHER PUBLICATIONS

Balakrishnan, et al., (1995); "Improving Reliable Transport and Handoff Performance in Cellular Wireless Networks", Wireless Networks, ACM, 1:469-481.
(Continued)

*Primary Examiner* — Christopher Crutchfield
*Assistant Examiner* — Tito Pham
(74) *Attorney, Agent, or Firm* — Mintz Levin Cohn Ferris Glovsky and Popeo, P.C.

(57) ABSTRACT

A system, a method, a device, and a computer program product for transmission of data packets between a user device and a server. A transmission control protocol proxy component for establishing a communication link between the user device and the server in accordance with a transmission control protocol for transmission of a data packet between the user device and the server is provided. The data packet is transmitted utilizing the transmission control protocol.

27 Claims, 10 Drawing Sheets

Related U.S. Application Data filed on Mar. 25, 2013, provisional application No. 61/804,920, filed on Mar. 25, 2013, provisional application No. 61/804,932, filed on Mar. 25, 2013.

(51) Int. Cl.
*H04W 80/06* (2009.01)
*H04W 28/02* (2009.01)
*H04L 12/801* (2013.01)
*H04L 12/893* (2013.01)

(52) U.S. Cl.
CPC .......... *H04L 1/1887* (2013.01); *H04L 47/193* (2013.01); *H04L 47/40* (2013.01); *H04L 69/16* (2013.01); *H04L 69/163* (2013.01); *H04W 28/0273* (2013.01); *H04W 80/06* (2013.01)

(58) Field of Classification Search
CPC .. H04L 69/16; H04L 69/163; H04W 28/0273; H04W 80/06
See application file for complete search history.

(56) References Cited

U.S. PATENT DOCUMENTS

| | | | |
|---|---|---|---|
| 2002/0172178 A1* | 11/2002 | Suzuki et al. | 370/338 |
| 2003/0235171 A1* | 12/2003 | Lundstrom et al. | 370/338 |
| 2009/0201813 A1* | 8/2009 | Speight | 370/235 |
| 2009/0252148 A1 | 10/2009 | Dolganow et al. | 370/351 |
| 2010/0054231 A1* | 3/2010 | Dolganow et al. | 370/349 |
| 2010/0062781 A1 | 3/2010 | Dolganow et al. | |
| 2010/0067489 A1 | 3/2010 | Pelletier et al. | |
| 2011/0242975 A1 | 10/2011 | Zhao et al. | |
| 2011/0267951 A1 | 11/2011 | Stanwood et al. | |
| 2012/0163298 A1 | 6/2012 | Zhou et al. | |
| 2012/0257581 A1 | 10/2012 | De | |
| 2012/0290727 A1* | 11/2012 | Tivig | H04L 47/193 709/227 |
| 2012/0300710 A1 | 11/2012 | Li et al. | |
| 2012/0300747 A1 | 11/2012 | Westberg et al. | |
| 2013/0051329 A1 | 2/2013 | Take | |
| 2013/0272181 A1 | 10/2013 | Fong et al. | |
| 2014/0226481 A1 | 8/2014 | Dahod et al. | |
| 2014/0233413 A1 | 8/2014 | Dahod et al. | |
| 2014/0233454 A1* | 8/2014 | Speight et al. | 370/315 |
| 2014/0233459 A1 | 8/2014 | Dahod et al. | |
| 2014/0233479 A1 | 8/2014 | Dahod et al. | |

FOREIGN PATENT DOCUMENTS

| | | |
|---|---|---|
| EP | 2 530 988 A1 | 12/2012 |
| WO | WO-2011/080714 A2 | 7/2011 |
| WO | WO-2012/084636 A1 | 6/2012 |
| WO | WO-2012/139016 A2 | 10/2012 |
| WO | WO-2012/139664 A1 | 10/2012 |
| WO | WO-2012/177763 A2 | 12/2012 |
| WO | WO-2013/038167 A2 | 3/2013 |
| WO | WO-2014/127054 A1 | 8/2014 |
| WO | WO-2014/130708 A1 | 8/2014 |
| WO | WO-2014/130709 A1 | 8/2014 |
| WO | WO-2014/130713 A1 | 8/2014 |
| WO | WO-2014/160709 A2 | 10/2014 |
| WO | WO-2014/160718 A1 | 10/2014 |
| WO | WO-2014/160722 A1 | 10/2014 |

OTHER PUBLICATIONS

Border et al., (2001); "Performance Enhancing Proxies Intended to Mitigate Link-Related Degradations", Network Working Group Request for Comments: 3135; pp. 1-45.

Du, et al., (2009); "Downlink Scheduling for Multimedia Multicast/ Broadcast over Mobile WiMAX: Connection-Oriented Multistate Adaptation", IEEE Wireless Communications, pp. 72-79.

Yoon, et al., (2012); "MuVi", Mobile Computing and Networking, ACM, pp. 209-220.

International Search Report for PCT/US2014/016123, dated Jul. 22, 2014.

International Search Report for PCT/US2014/017456, dated Jul. 3, 2014.

International Search Report for PCT/US2014/017459, dated Jul. 3, 2014.

International Search Report for PCT/US2014/017464, dated Jun. 16, 2014.

International Search Report for PCT/US2014/031749, dated Aug. 5, 2014.

International Search Report for PCT/US2014/031725, dated Oct. 7, 2014.

International Search Report for PCT/US2014/031744, dated Sep. 4, 2014.

International Search Report for PCT/US2014/031753, dated Aug. 14, 2014.

* cited by examiner

TRANSMISSION CONTROL PROTOCOL PROXY IN LONG TERM EVOLUTION RADIO ACCESS NETWORK

CROSS-REFERENCE TO RELATED APPLICATIONS

The present application claims priority to U.S. Provisional Patent Application No. 61/804,893, filed Mar. 25, 2013, and entitled "Transmission Control Protocol Proxy In Evolved Node B", U.S. Provisional Patent Application No. 61/804,920, filed Mar. 25, 2013, and entitled "Transmission Control Protocol Redundancy Elimination In A Mobile Communication Network", U.S. Provisional Patent Application No. 61/804,932, filed Mar. 25, 2013, and entitled "Transmission Control Protocol State Aware Scheduler In Evolved Node B", and U.S. Provisional Patent Application No. 61/804,991, filed Mar. 25, 2013, and entitled "Transmission Control Protocol Proxy To Improve Battery Life Of User Equipment In A Mobile Communication Network," and incorporates their disclosures herein by reference in their entireties.

TECHNICAL FIELD

The subject matter described herein generally relates to data processing and in particular, to transmission control protocol in a long term evolution radio access network.

BACKGROUND

In today's world, cellular networks provide on-demand communications capabilities to individuals and business entities. Typically, a cellular network is wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide guaranteed bandwidth within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. LTE is based on the GSM/EDGE and UMTS/HSPA digital cellular technologies and allows for increasing capacity and speed by using a different radio interface together with core network improvements.

Communications links typically connect endpoint devices (e.g., mobile telephones, personal computers, servers, etc.) so that devices can transmit data to one another. Data transmissions are typically governed by various protocols that are specified in the Internet protocol suite, which includes the networking model and a set of communications protocols used for the Internet and/or similar networks. The Internet protocol suite is typically referred to as TCP/IP and contains its most important protocols: the Transmission Control Protocol ("TCP") and the Internet Protocol ("IP"). The TCP/IP model and protocols are maintained by the Internet Engineering Task Force ("IETF"). TCP/IP provides end-to-end connectivity specifying how data should be formatted, addressed, transmitted, routed and received at the destination endpoint device. TCP/IP protocols are organized into the following four abstraction layers (from lowest to highest): the link layer (containing communication technologies for a single network segment (link)), the internet layer (connecting independent networks to establish internetworking), the transport layer (handling process-to-process communication), and the application layer (providing interfaces to the user and support services).

In view of large amounts of data that are typically transmitted to and/from endpoint devices in existing wireless communications systems, such systems and/or associated endpoint devices are affected by various problems, such as data loss, congestion, redundant transmissions, battery power loss (e.g., in user equipment), and others. Thus, there is a need to provide a wireless communication system that is capable of providing an efficient, cost-effective and reliable transmission of data between endpoint devices using TCP.

SUMMARY

In some implementations, the current subject matter relates to a computer-implemented method for transmission of data packets between a user device and a server. The method can include providing a transmission control protocol ("TCP") proxy component. The TCP proxy component can establish a communication link between the user device and the server in accordance with a transmission control protocol for transmission of a data packet between the user device and the server. The TCP proxy component can be provided in a base station (e.g., an eNodeB) and/or can be communicatively coupled to the base station. In some implementations, TCP proxy component can act as a proxy and/or an intermediary between the user device and the server. The TCP proxy component can be a software module and/or any combination of hardware and/or software components that can be disposed in a base station (e.g., eNodeB) and be communicatively coupled to it. These components can be separate from other components of the base station and/or share components with other hardware and/or software disposed in the base station. The method also include transmitting the data packet utilizing the transmission control protocol.

In some implementations, the current subject matter can include one or more of the following optional features. The method can include preventing re-transmission of the data packet from the server to the user device upon the server failing to receive an acknowledgement from the user device within a predetermined period of time. In some implementations, the method can include sending to the server the acknowledgement indicating receipt of the data packet by the user device.

In some implementations, the method can include preventing transmission of multiple acknowledgements from the user device indicating receipt of the data packet by the user device.

In some implementations, the method can also include sending to the server an acknowledgement indicating a receipt of the data packet by the user device upon receiving a confirmation that the data packet was received by the user device, the confirmation being generated by at least one of the media access control (MAC) layer of the user device and a radio link control (RLC) layer of the user device.

In some implementations, the transmission control protocol proxy component can include at least one transmission control protocol optimization component configured to perform optimization of at least one transmission control protocol parameter. In some implementations, the user device can include a power source configured to power the user device for transmission and receiving of data from the base station, and the optimization of the at least one transmission control protocol parameter can be configured to reduce consumption of power in the power source of the user device. In some implementations, the optimization of the at least one transmission control protocol parameter can be configured to reduce consumption of physical uplink shared channel ("PUSCH") resources associated with a communications link between the user device and a base station comprising at least one processor and at least one memory. In some implementations, the optimization of at least one transmission control protocol parameter can be configured to reduce interference of an uplink communications link between the user device and a base station comprising at least one processor and at least one memory.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

To address the deficiencies of currently available solutions, one or more implementations of the current subject matter provide a long term evolution radio access network having intelligent capabilities, including transmission of data using TCP.

I. Long Term Evolution Communications System

FIGS. 1a-c and 2 illustrate an exemplary conventional long term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1A:
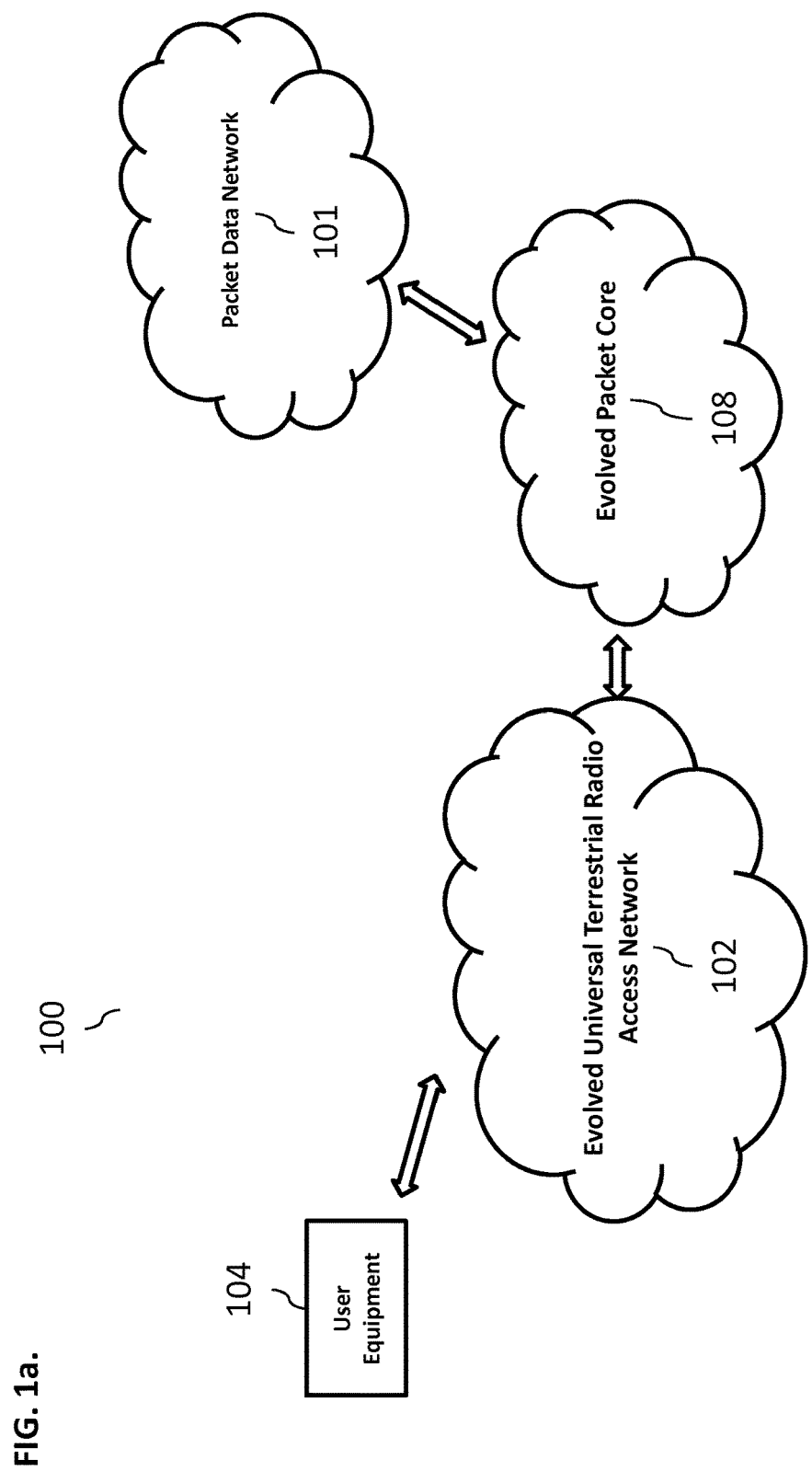
FIG. 1a illustrates an exemplary conventional long term evolution ("LTE") communications system.
Figure 1B:
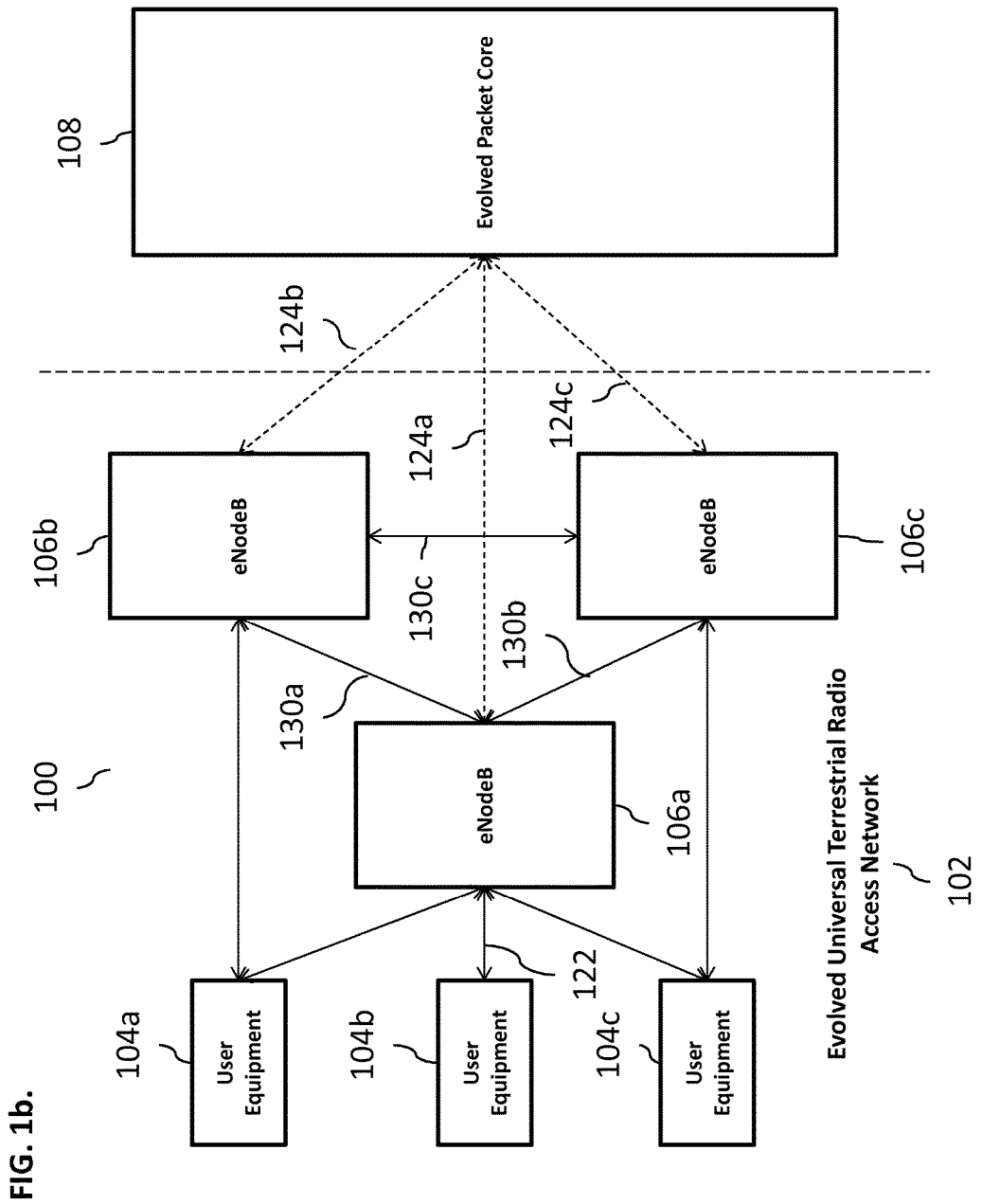

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a table, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
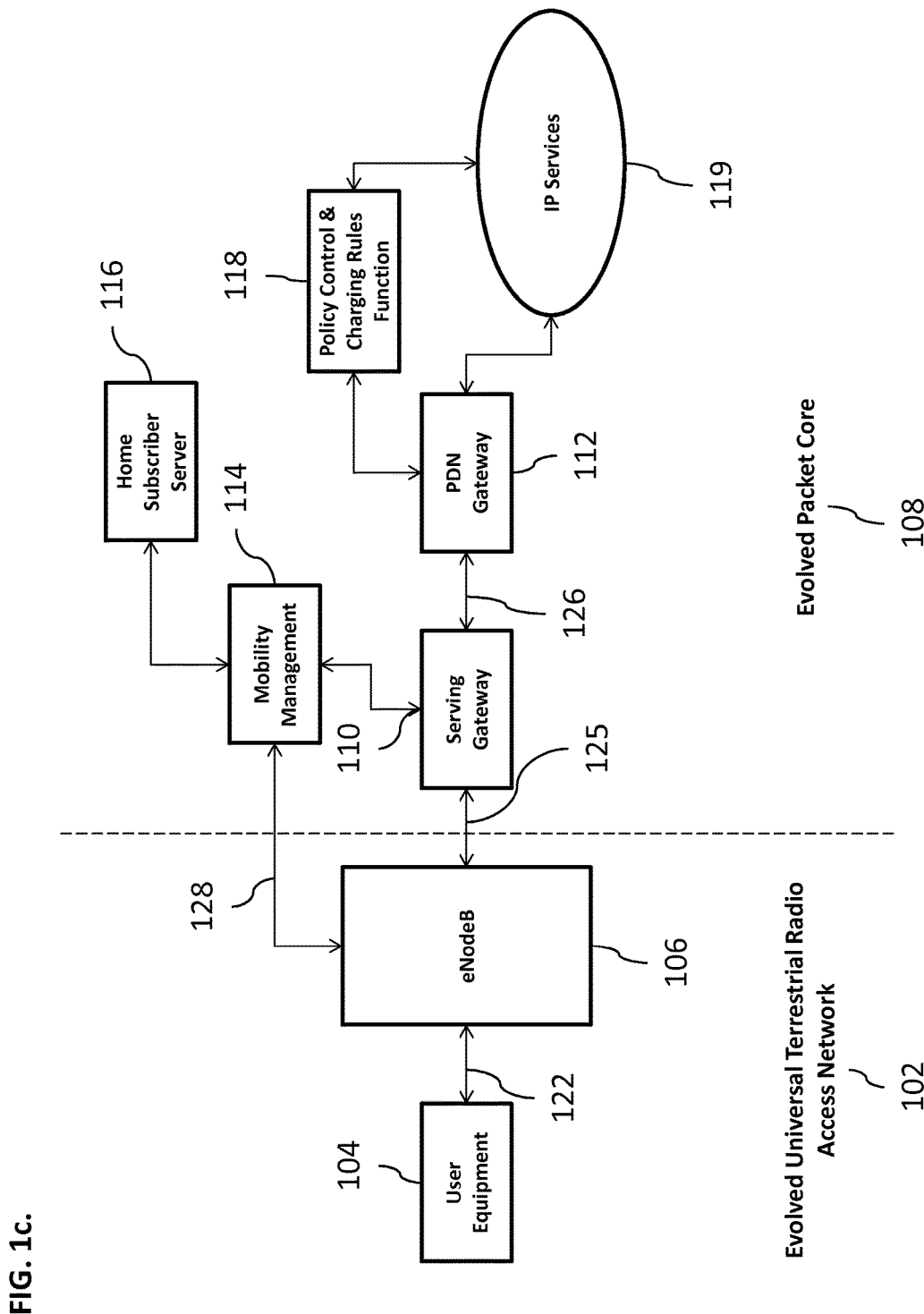

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to inter-work with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

II. eNodeB

Figure 1D:
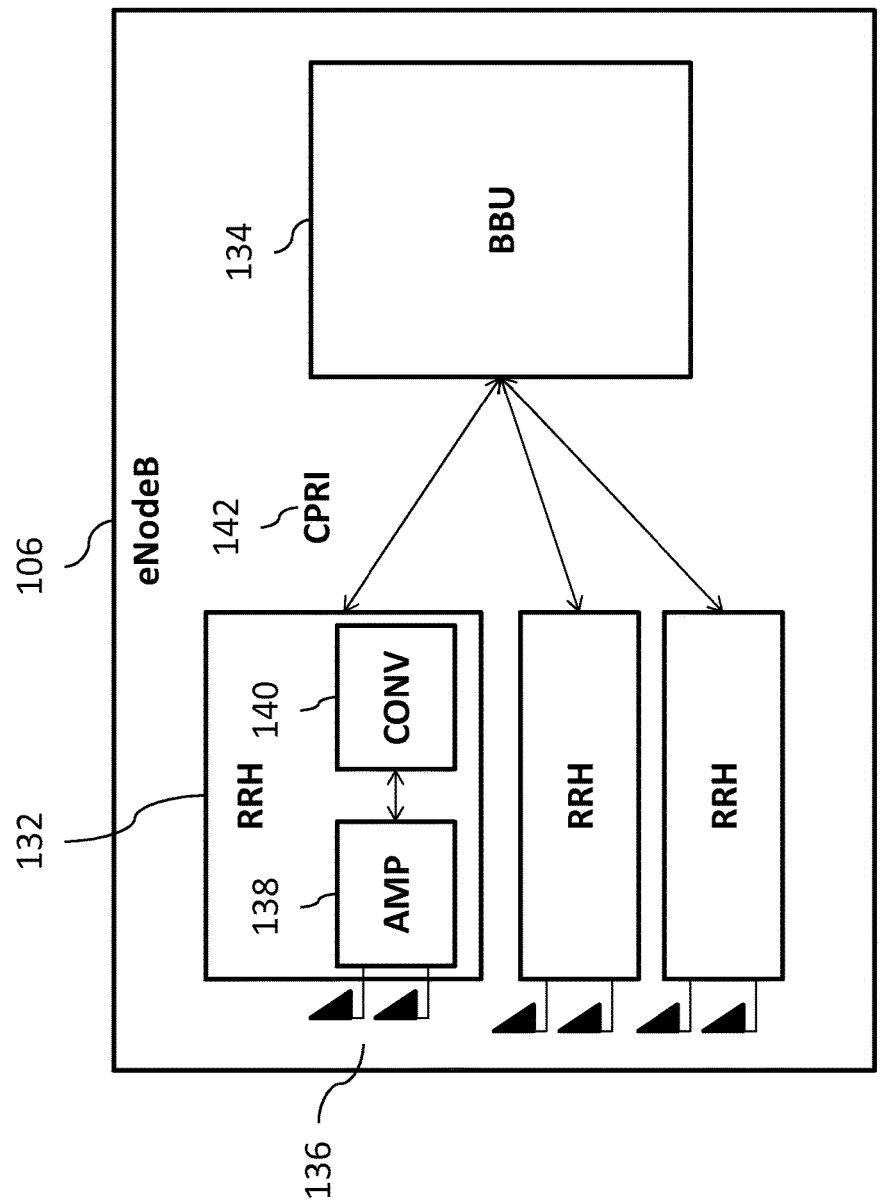

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
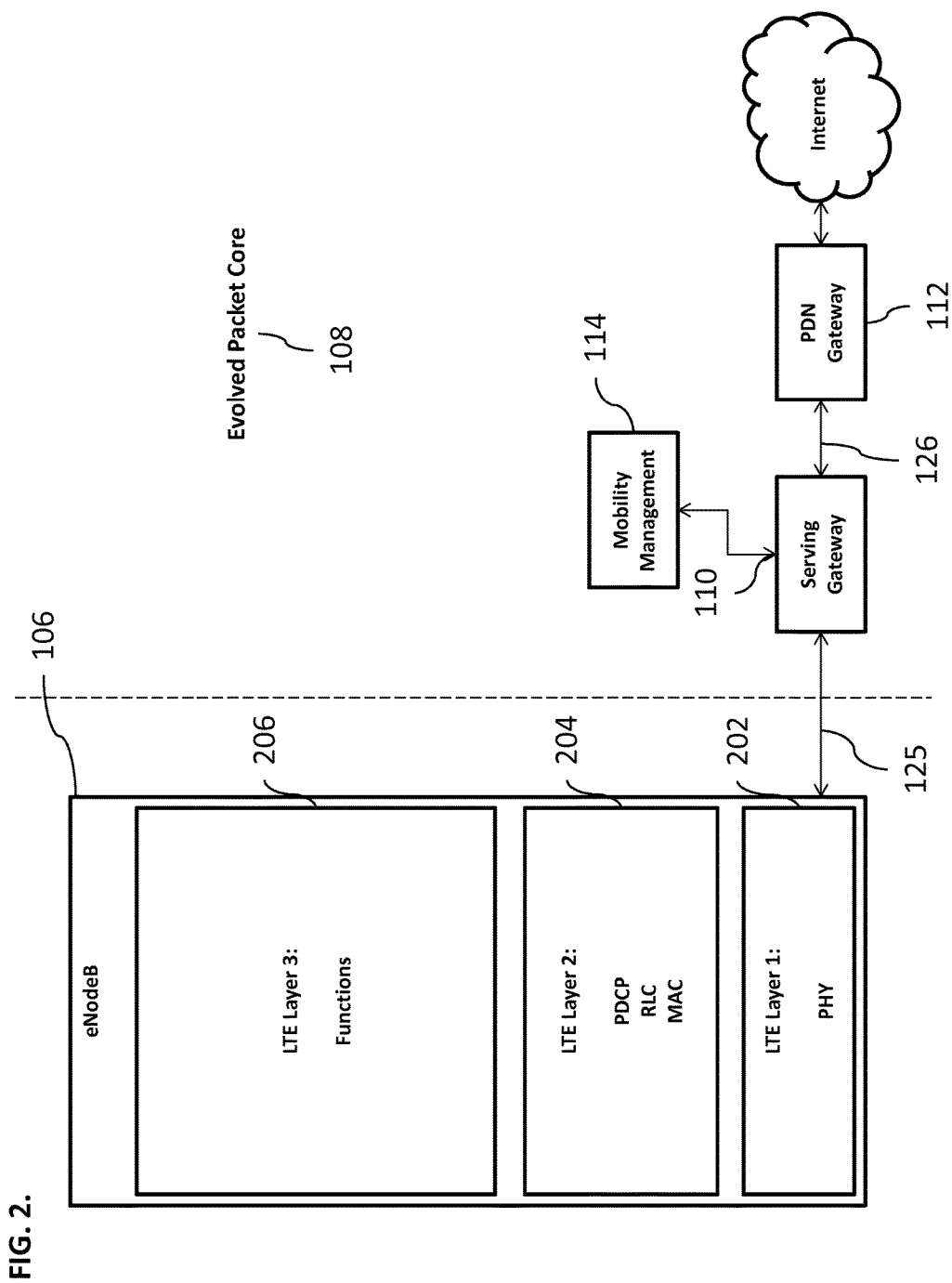
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

III. Intelligent LTE Radio Access Network

Figure 3:
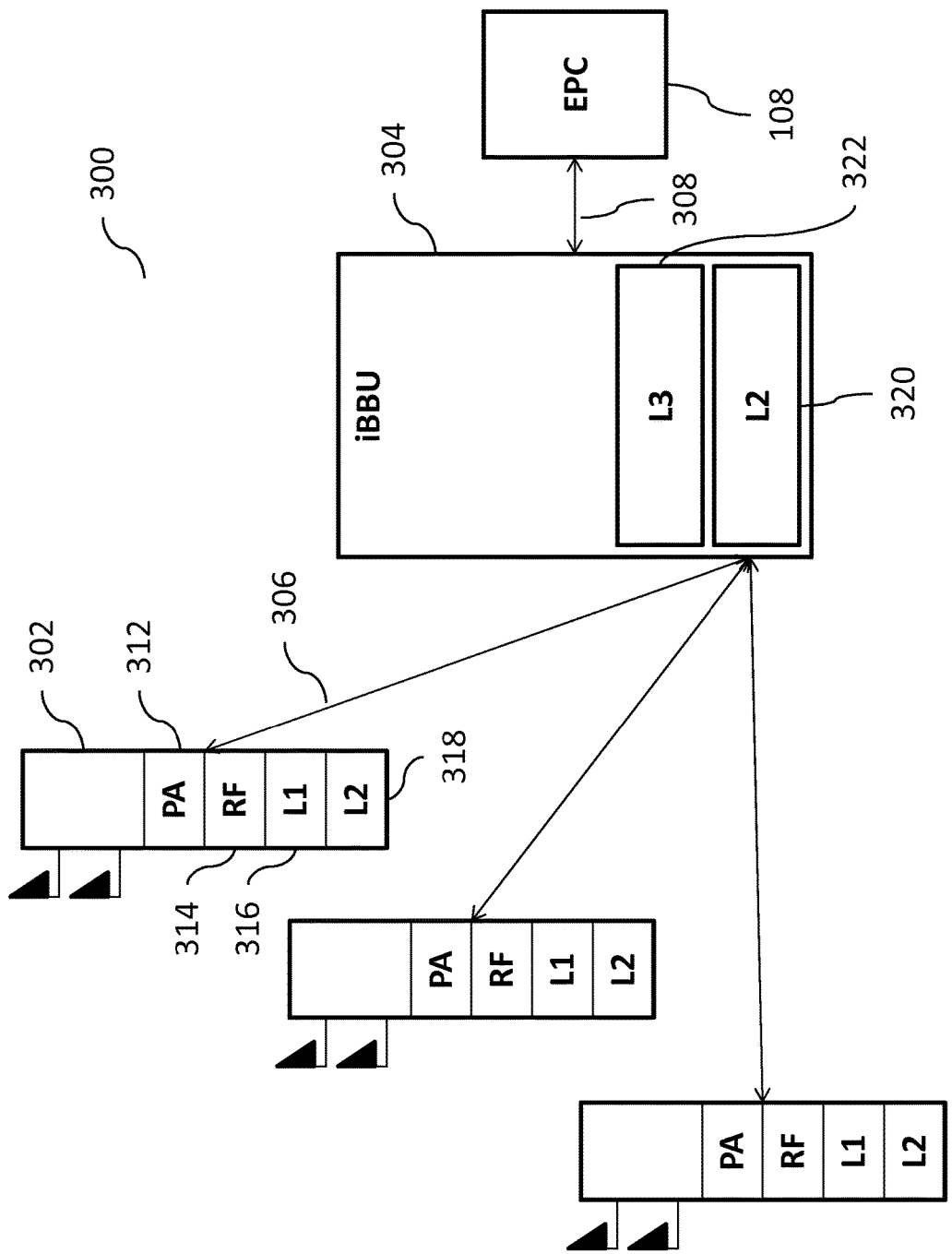
FIG. 3 illustrates an exemplary intelligent Long Term Evolution Radio Access Network, according to some implementations of the current subject matter.

FIG. 3 illustrates an exemplary system 300, according to some implementations of the current subject matter. The system 300 can be implemented as a centralized cloud radio access network ("C-RAN"). The system 300 can include at least one intelligent remote radio head ("iRRH") unit 302 and an intelligent baseband unit ("iBBU) 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with RLC and PDCP. Thus, the system 300 can be configured to split functionalities/protocols associated with RLC and PDCP between iRRH 302 and the iBBU 304.

IV. TCP in Intelligent LTE Radio Access Network

In some implementations, the current subject matter system can be configured to implement and/or otherwise use transmission control protocol ("TCP") for the purposes of data transmissions between a user equipment and a server via an eNodeB. The eNodeB can be configured to handle TCP transmissions and can include a TCP processor that can act as a proxy component for managing such data transmissions.

TCP is considered as one of the core protocols of the Internet protocol suite ("IP") and provides reliable, ordered, error-checked delivery of a stream of octets between programs running on devices that can be connected to a network (e.g., a local area network, intranet or the public Internet. TCP resides in the transport layer. TCP accepts data from a data stream, divides it into chunks, and adds a TCP header, which creates a TCP segment. The TCP segment is then encapsulated into an IP datagram and exchanged with peer devices.

A TCP segment includes a TCP header and a data section. The TCP header contains ten mandatory fields and an optional extension field. The data section follows the header and includes payload data carried for an application. The length of the data section is calculated by subtracting the combined length of the TCP header and the encapsulating IP header from the total IP datagram length (as specified in the IP header). Web browsers or other applications use TCP, when they connect to servers on the World Wide Web, to deliver payload data (e.g., email, files, etc.) and/or transfer files from one location to another.

TCP protocol operations include three phases: connection establishment, data transfer, and connection termination. Connection establishment involves a multi-step handshake process which is followed by the data transfer phase. After data transmission is completed, the connection termination phase closes established virtual circuits and releases all allocated resources. TCP connections are managed by an operating system through a programming interface that represents an endpoint for communications, i.e., an Internet socket.

To establish a connection, TCP uses a three-way handshake. However, before a client (e.g., a software application, an endpoint device (e.g., a personal computer, a wireless device, a server, etc.)) can connect to a server, the server performs a passive open procedure (i.e., binding to and listening at a port to open it up for connections). Once established, the client application initiates an active open. During the active open, the three-way handshake includes: sending a SYN packet from the client to the server, where the client sets the segment's sequence number to a random value; sending a SYN-ACK packet from the server in reply, where the packet includes an acknowledgment number that is set to one more than the received sequence number and a sequence number chosen by the server for the packet, where the sequence number is another random number; and sending an ACK packet from the client back to the server. In the ACK packet, the sequence number is set to the received acknowledgement value and the acknowledgement number is set to one more than the received sequence number.

To terminate a connection, a four-way handshake is used, where each side (client and server) terminates connection independently. When an endpoint device wishes to stop its half of the connection, it transmits a FIN packet, where the other endpoint device acknowledges with an ACK packet. Thus, connection termination typically includes a pair of FIN and ACK packets from each TCP endpoint device.

Transmission of data using TCP can occur between devices in wired and/or wireless communications networks. To allow use of the TCP for data transmission purposes between user equipment in a wireless network (such as networks discussed in connection with FIGS. 1a-3 above) and servers, a TCP processor can be included in the eNodeB.

A. TCP Proxy

Figure 4:
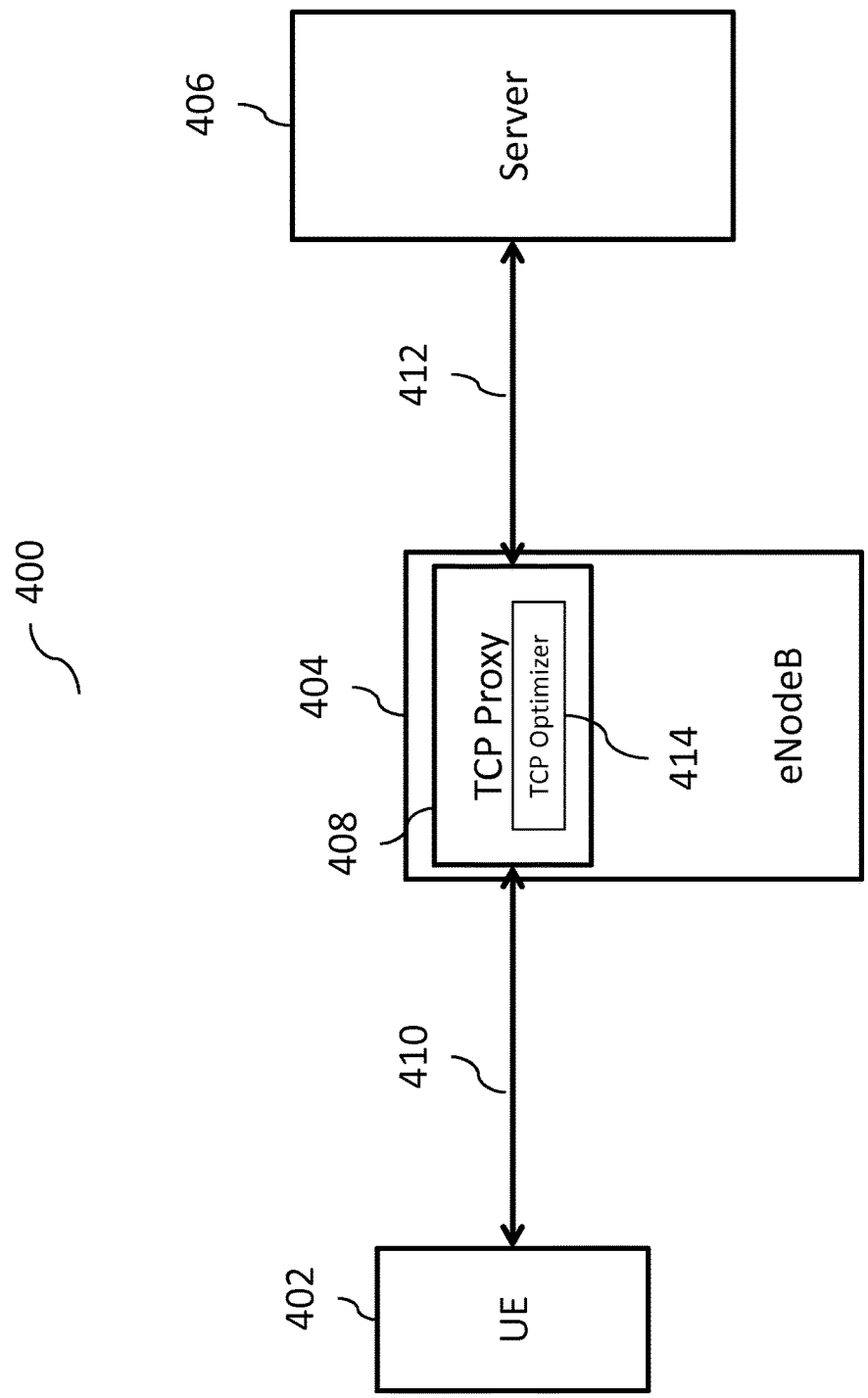
FIG. 4 illustrates an exemplary communications system that includes a TCP functionality in a base station, according to some implementations of the current subject matter.

FIG. 4 illustrates an exemplary system 400 having a TCP processor, i.e., a back-to-back TCP server and a TCP client in an eNodeB, according to some implementations of the current subject matter. The system 400 can include an eNodeB 404 and/or any other type of base station communicatively coupled with a user equipment 402 via an over-the-air link 410 and with a server 406 via link 412. The server 406 can be part of the core network (not shown in FIG. 4) and/or can be a server outside of the core network. The server can include and/or obtain data that is desired by the user equipment 402. The user equipment 402 can communicate with the eNodeB 404, as discussed above in connection with FIGS. 1a-3. The eNodeB 404 can include the structure shown in FIG. 3 and discussed above.

In some implementations, the eNodeB 404 can include a TCP processor 408 that can act as a proxy and/or an intermediary between the user equipment 402 and the server 406. The TCP processor 408 can be a software module and/or any combination of hardware and/or software components that can be disposed in a base station (e.g., eNodeB 404). These components can be separate from other components of the base station and/or share components with other hardware and/or software disposed in the base station.

To establish connection between the user equipment 402 and the server 406, the TCP processor 408 proxies on behalf of the TCP server 406 to establish a TCP connection with the user equipment 402, and then proxies on behalf of the user equipment 402 towards the TCP sever 406 by establishing a TCP session with the TCP server 406. The TCP processor 408 can transmit data received from the user equipment 402 to the server 406 as well as transmit data received from the server 406 to the user equipment 402. The TCP processor 408 can interact with a Level 2 components, such as PDCP and RLC components.

In TCP transmissions, throughput of a communication can be limited by two windows: a congestion window ("CNWD") and a receive window ("RW"). CNWD determines the number of bytes that can be outstanding at any time during a TCP transmission. This is different from TCP window size maintained by the receiver of data. CNWD prevents a link between two endpoints of the connection from getting overloaded with too much data traffic. The size of CNWD is calculated by estimating how much congestion there is between the two endpoints. The sender of data typically maintains CNWD. When a connection is set up, CNWD (a value maintained independently at each host) is set to a small multiple of the maximum segment size ("MSS") allowed on the connection. Further variance in the congestion window is determined by the known additive increase/multiplicative decrease ("AIMD") approach (i.e., a feedback control algorithm used in TCP congestion avoidance, which increases transmission rate (window size) until data loss occurs and/or increases CNWD by a fixed amount every round trip time. When congestion is detected, the transmitter decreases the transmission rate by a multiplicative factor (e.g., cut the congestion window in half after data loss)). If all segments are received and the acknowledgments reach the sender on time, a constant value is added to the window size. The window grows exponentially until a timeout occurs or the receiver reaches its limit (a threshold value "ssthresh"). After this, CNWD increases linearly at the rate of 1/(congestion window) packets on each new acknowledgement received. When timeout occurs, the following occurs: congestion window is reset to 1 MSS, "ssthresh" is set to half the window size before packet loss started, and "slow start" is initiated. A system administrator can adjust the maximum window size limit and/or adjust the constant added during additive increase, as part of TCP tuning. The flow of data over a TCP connection is also controlled by RW, which is provided by the receiver of data. The sender determines how much data it can send by comparing its own CNWD with RW.

To avoid congestion, CNWD should not exceed capacity of the network on which the data is transmitted. To control flow of data, RWND should not exceed capacity of receiver equipment to process data. The receiver equipment can be overwhelmed by data if the receiver (e.g., a Web server) is very busy. Typically, each TCP segment can contain a current value of RWND. If a sender receives an ACK, acknowledging byte 1000 and specifying RWND size of 5000 bytes, the sender will not send data packets after byte 6000, even if the CNWD allows it.

TCP splicing or delayed binding typically refers to a postponement of a connection between two endpoints in order to obtain sufficient information about the connection and/or endpoints to make an appropriate routing decision. Some endpoint devices (e.g., application switches, routers, etc.) can delay binding of a client session (e.g., user equipment) to a server until proper handshakes are completed.

B. TCP Optimizer: Optimizations with TCP Proxy at the eNodeB

In some implementations, the TCP processor 408 can include a TCP optimizer component 414. The TCP optimizer 414 can perform optimization and/or speeding up of the connection between the user equipment 402 and the server 406. The TCP optimizer 414 can be a software module and/or any combination of hardware and/or software components that can be disposed in a base station (e.g., eNodeB 404). These components can be separate from other components of the base station and/or share components with other hardware and/or software disposed in the base station.

In some implementations, the TCP optimizer 414 can reduce and/or eliminate TCP's slow start phase (a slow start phase is typically initiated after the three-way handshake process is completed). In some implementations, the TCP proxy at the eNodeB can terminate the TCP sessions over-the-air. Thus, it can move the TCP session to congestion avoidance state directly after a 3-way handshake is completed. In some implementations, the TCP proxy can be aware that there is only one hop for the TCP session, and it can also be aware of packet losses over the air due to co-location with LTE Layers (such as, MAC and RLC). Using the lower Layer assistance (e.g., MAC, RLC), the TCP proxy can re-send any lost data packet to the user equipment without having to fallback to a slow start mode. It can keep the TCP session in congestion avoidance state for maximum data transfer rate. In some implementations, the TCP proxy can eliminate a need for slow build-up of confidence in the slow start mode which can be a default to all TCP implementations.

Figure 5:
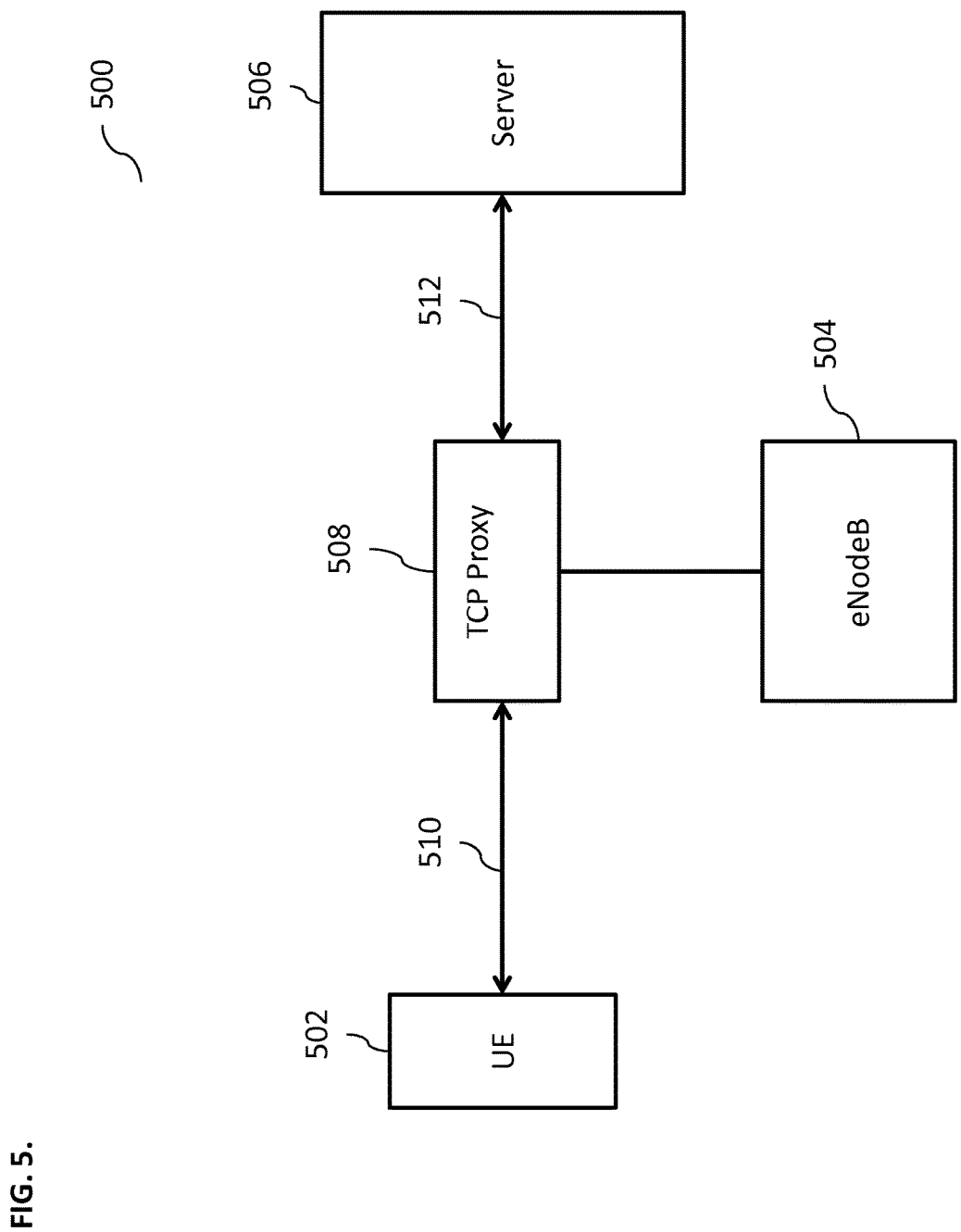
FIG. 5 illustrates an exemplary communications system that includes a TCP proxy component, according to some implementations of the current subject matter.

FIG. 5 illustrates an exemplary system 500 that can include a TCP proxy component 508, according to some implementations of the current subject matter. The TCP proxy component 508 can be communicatively coupled with a base station (e.g., eNodeB) 504. The TCP proxy component 508 can be part of the eNodeB 504 and/or can be a separate component. The TCP proxy component 508 can be communicatively coupled via a link 512 with a server 506 and can be configured to exchange data packets using a standard TCP operation protocol. The TCP proxy component 508 can be communicatively coupled with a user equipment 502 via a link 510. The TCP communications protocol can be implemented on the link 510, where TCP packets can be reliably exchanged using LTE Layer 2 components, which can include PDCP, RLC, and MAC hybrid automatic repeat request ("HARQ"). Use of the TCP proxy component 508 can be configured to reduce and/or substantially eliminate slow start associated with the TCP communication protocol. Additionally, the TCP proxy can substantially eliminate re-transmission of TCP packets and/or avoid unnecessarily triggering TCP congestion avoidance. Further, latency that can be experienced by the user can be also reduced, thereby enhancing quality of service ("QoS"). Also, the TCP proxy component 508 can improve good throughput. The TCP proxy component 508 can be advantageous as it does not require an enhanced TCP stack in the client and the server. Additional benefits of the TCP proxy component 508 can include, but are not limited to, an improved battery life of the user equipment (it is well known that in LTE communications systems, battery life of the user equipment can be short given the amount of processing it performs); savings in PUSCH resources; and reduction in uplink interference, especially at cell edge.

Referring back to FIG. 4, in some implementations, the TCP optimizer component 414 can be used to improve radio spectrum utilization by eliminating unnecessary re-transmissions and avoiding false trigger of TCP congestion avoidance protocols. The TCP-proxy 408 can serve data packets to the user equipment 402 from the local cache buffer that can be included in the eNodeB that can be created via a back-to-back TCP client, which fetches data from the server 406. By utilizing lower Layer reliable delivery schemes provided by LTE (such as at MAC and/or RLC layers), the TCP proxy can manage data transfer rates, re-transmissions from local cache when necessary based on the feedback from lower layers. This can help to eliminate a need for redundant re-transmissions of packets delivered over-the-air, which typically occurs in a regular TCP session. This can also help in substantially eliminating wasteful radio resource usage, thereby increasing spectrum utilization.

In some implementations, the TCP optimizer component 414 can further reduce latency experienced by the user during connections with the server 406, thereby enhancing QoS. Additionally, it can improve a good throughput of the connection between the user equipment 402 and the server 406 without requiring an enhanced TCP stack in the user equipment 402 and/or in the server 406.

In some implementations, use of the TCP proxy 408 can improve battery life of the user equipment 402, save physical uplink shared channel ("PUSCH") resources, and reduce uplink interference, especially, at the cell's edge.

In some implementations, the TCP processor 408 can also reduce consumption of a power source of the user equipment 402. In the user equipment 402, life of its power source can be directly proportional to requirements and/or usage of an uplink ("UL") connection with the user equipment 402. The uplink connection with the user equipment is typically used for transmitting TCP acknowledgements ("ACKs"). Sending such ACKs can consume a significant amount of power of the power source in the user equipment. This can be especially true in uplink-limited systems that can require the user equipment 402 to send uplink transmissions with an increased power thereby causing an increased power consumption.

In some implementations, the eNodeB 404 can be informed as to the information concerning packet delivery on a downlink connection to the user equipment. In that regard, the eNodeB 404 can include a module that can suppress or otherwise prevent sending of the ACKs. In some implementations, the TCP processor 408 can send the ACKs to the server 406. Further, a software client in the user equipment 402 can also suppress the TCP ACKs so that PUSCH resources are not requested by the user equipment for this purpose, thereby increasing life of the power source in the user equipment 402.

In some implementations, the TCP proxy processor 408 can be configured to send an acknowledgement to the server 406 asynchronously and at the same time send data packets to the user equipment 402. This can allow for independent communications between the three components: TCP proxy 408, the user equipment 402, and server 406, i.e., communication between the TCP proxy 408 and the user equipment 402 can be independent of the communication between the TCP proxy 408 and the server 406. Lower Layers can be used to send any lost data packets over the air to reduce number of re-transmission requests.

Figure 6:
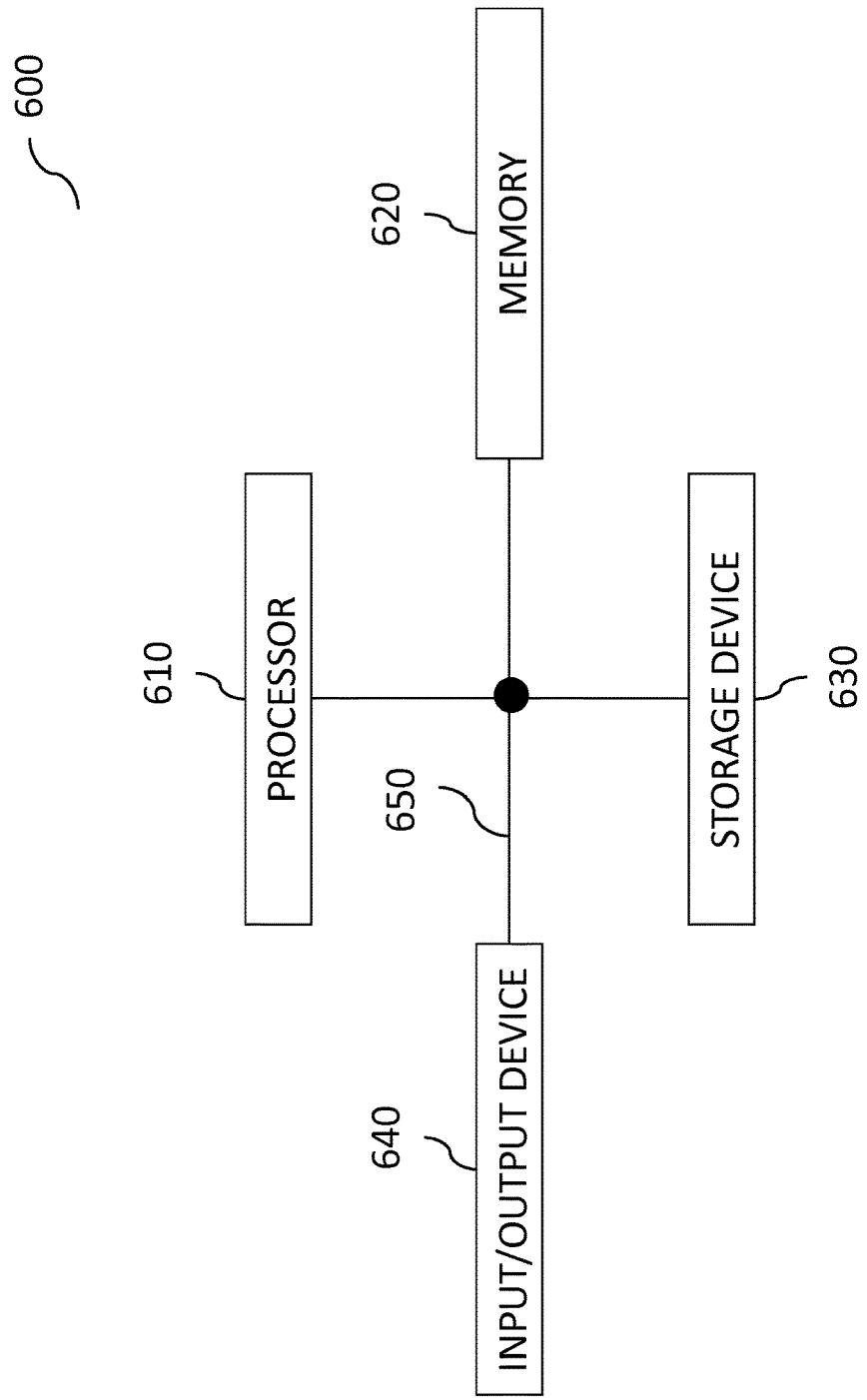
FIG. 6 illustrates an exemplary system, according to some implementations of the current subject matter.

In some implementations, the current subject matter can be configured to be implemented in a system 600, as shown in FIG. 6. The system 600 can include one or more of a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
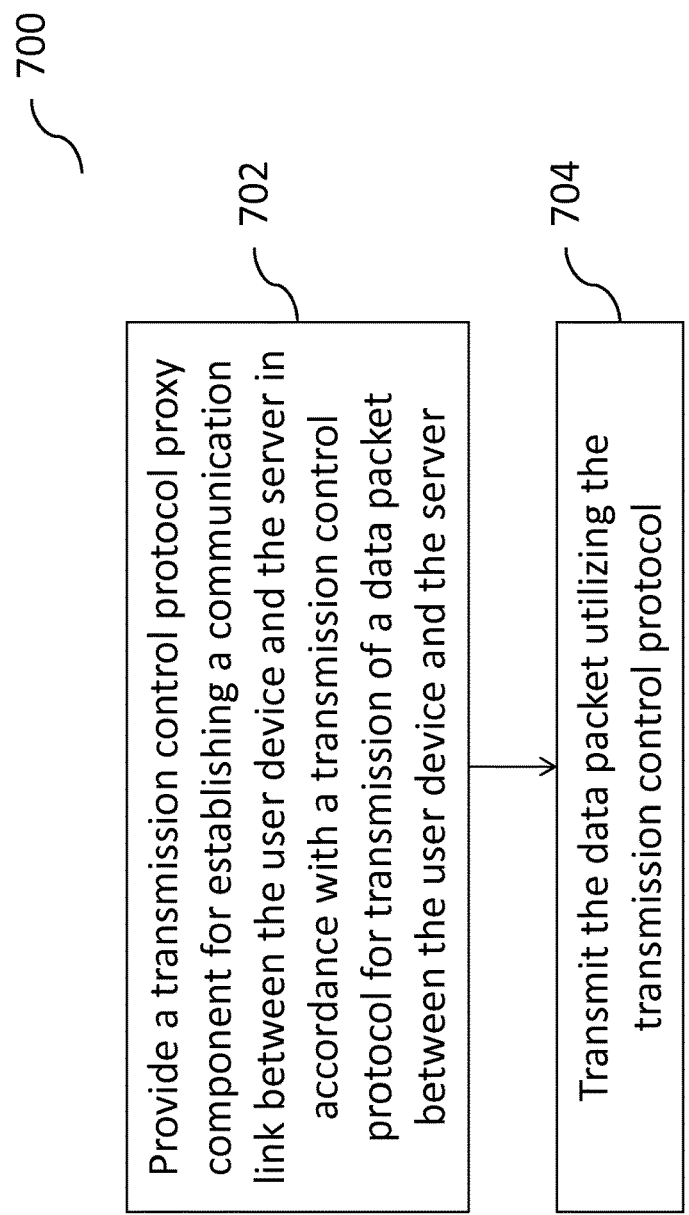
FIG. 7 illustrates an exemplary method, according to some implementations of the current subject matter.

FIG. 7 illustrates an exemplary method 700 for transmission of data packets between a user device and a server, according to some implementations of the current subject matter. At 702, a transmission control protocol ("TCP") proxy component can be provided. The TCP proxy component can establish a communication link between the user device and the server in accordance with a transmission control protocol for transmission of a data packet between the user device and the server. The TCP proxy component can be provided in a base station (e.g., an eNodeB as shown in and described above in connection with FIGS. 3-5) and/or can be communicatively coupled to the base station. At 704, the data packet can be transmitted utilizing the transmission control protocol.

In some implementations, the current subject matter can include one or more of the following optional features. The method can include preventing re-transmission of the data packet from the server to the user device upon the server failing to receive an acknowledgement from the user device within a predetermined period of time. In some implementations, the method can include sending to the server the acknowledgement indicating receipt of the data packet by the user device. In some implementations, at stated above, the TCP proxy can send an acknowledgement to the server asynchronously and at the same time send data packets to the user device. As such, communication between the TCP proxy and the user device can be independent of the communication between the TCP proxy and the server. The TCP proxy can rely on lower Layers to send any data packets that can be lost over the air to reduce number of re-transmission requests.

In some implementations, the method can include preventing transmission of multiple acknowledgements from the user device indicating receipt of the data packet by the user device.

In some implementations, the method can also include sending to the server an acknowledgement indicating a receipt of the data packet by the user device upon receiving a confirmation that the data packet was received by the user device, the confirmation being generated by at least one of the media access control (MAC) layer of the user device and a radio link control (RLC) layer of the user device.

In some implementations, the transmission control protocol proxy component can include at least one transmission control protocol optimization component configured to perform optimization of at least one transmission control protocol parameter. In some implementations, the user device can include a power source configured to power the user device for transmission and receiving of data from the base station, and the optimization of the at least one transmission control protocol parameter can be configured to reduce consumption of power in the power source of the user device. In some implementations, the optimization of the at least one transmission control protocol parameter can be configured to reduce consumption of physical uplink shared channel ("PUSCH") resources associated with a communications link between the user device and a base station comprising at least one processor and at least one memory. In some implementations, the optimization of at least one transmission control protocol parameter can be configured to reduce interference of an uplink communications link between the user device and a base station comprising at least one processor and at least one memory.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A device for transmission of data packets between a user device and a server, the device comprising:
   at least one memory; and
   at least one processor operatively coupled to the memory, the at least one processor being configured to:
   provide a transmission control protocol (TCP) proxy component for establishing a communication link between the user device and the server in accordance with a transmission control protocol for transmission of a data packet between the user device and the server, wherein the transmission control protocol proxy component
   establishes a first TCP proxy communication link with the user device on behalf of the server;
   establishes a second TCP proxy communication link with the server on behalf of the user device; and
   initiates a congestion avoidance protocol based on the established first and second TCP proxy communication links and eliminates a slow start phase of transmission control protocol;
   transmit the data packet to the user device utilizing the transmission control protocol and, at the same time, asynchronously transmit an acknowledgement indicative of a receipt of the data packet by the user device to the server, wherein transmission of an acknowledgement of a receipt of the data packet by the user device is configured to be suppressed at the user device; and
   prevent re-transmission of the data packet from the server to the user device upon the server failing to receive an acknowledgement from the user device within a predetermined period of time.

2. The device according to claim 1, further comprising an evolved node (eNodeB) base station, the eNodeB base station comprising the at least one processor and the at least one memory.

3. The device according to claim 1, wherein at least one processor being configured to send to the server the acknowledgement indicating receipt of the data packet by the user device.

4. The device according to claim 1, wherein at least one processor being configured to prevent transmission of multiple acknowledgements from the user device indicating receipt of the data packet by the user device.

5. The device according to claim 1, wherein at least one processor being configured to send to the server an acknowledgement indicating a receipt of the data packet by the user device upon receiving a confirmation that the data packet was received by the user device, the confirmation being generated by at least one of the media access control (MAC) layer of the user device and a radio link control (RLC) layer of the user device.

6. The device according to claim 1, wherein the transmission control protocol proxy component includes at least one transmission control protocol optimization component configured to perform optimization of at least one transmission control protocol parameter.

7. The device according to claim 6, wherein
the user device includes a power source configured to power the user device for transmission and receiving of data from the base station; and
the optimization of the at least one transmission control protocol parameter is configured to reduce consumption of power in the power source of the user device.

8. The device according to claim 6, wherein the optimization of at least one transmission control protocol parameter is configured to reduce consumption of physical uplink shared channel ("PUSCH") resources associated with a communications link between the user device and a base station comprising the at least one processor and the at least one memory.

9. The device according to claim 6, wherein the optimization of at least one transmission control protocol parameter is configured to reduce interference of an uplink communications link between the user device and a base station comprising the at least one processor and the at least one memory.

10. A computer-implemented method for transmission of data packets between a user device and a server, the method comprising:
providing a transmission control protocol (TCP) proxy component for establishing a communication link between the user device and the server in accordance with a transmission control protocol for transmission of a data packet between the user device and the server, wherein the transmission control protocol proxy component
establishes a first TCP proxy communication link with the user device on behalf of the server;
establishes a second TCP proxy communication link with the server on behalf of the user device; and
initiates a congestion avoidance protocol based on the established first and second TCP proxy communication links and eliminates a slow start phase of transmission control protocol;
transmitting the data packet to the user device utilizing the transmission control protocol and, at the same time, asynchronously transmit an acknowledgement indicative of a receipt of the data packet by the user device to the server, wherein transmission of an acknowledgement of a receipt of the data packet by the user device is configured to be suppressed at the user device; and
preventing re-transmission of the data packet from the server to the user device upon the server failing to receive an acknowledgement from the user device within a predetermined period of time;
wherein at least one of the providing, the transmitting, and the preventing is performed by at least one processor of at least one computing system.

11. The method according to claim 10, wherein an evolved node (eNodeB) base station performs at least one of the providing and the transmitting, the eNodeB base station comprising at least one processor and at least one memory.

12. The method according to claim 10, further comprising
sending to the server the acknowledgement indicating receipt of the data packet by the user device.

13. The method according to claim 10, further comprising
preventing transmission of multiple acknowledgements from the user device indicating receipt of the data packet by the user device.

14. The method according to claim 10, further comprising
sending to the server an acknowledgement indicating a receipt of the data packet by the user device upon receiving a confirmation that the data packet was received by the user device, the confirmation being generated by at least one of the media access control (MAC) layer of the user device and a radio link control (RLC) layer of the user device.

15. The method according to claim 10, wherein the transmission control protocol proxy component includes at least one transmission control protocol optimization component configured to perform optimization of at least one transmission control protocol parameter.

16. The method according to claim 15, wherein
the user device includes a power source configured to power the user device for transmission and receiving of data from the base station; and
the optimization of the at least one transmission control protocol parameter is configured to reduce consumption of power in the power source of the user device.

17. The method according to claim 15, wherein the optimization of the at least one transmission control protocol parameter is configured to reduce consumption of physical uplink shared channel ("PUSCH") resources associated with a communications link between the user device and a base station comprising at least one processor and at least one memory.

18. The method according to claim 15, wherein the optimization of the at least one transmission control protocol parameter is configured to reduce interference of an uplink communications link between the user device and a base station comprising at least one processor and at least one memory.

19. A computer program product, for transmission of data packets between a user device and a server, comprising a non-transitory machine-readable medium storing instructions that, when executed by at least one programmable processor, cause the at least one programmable processor to perform operations comprising:
providing a transmission control protocol (TCP) proxy component for establishing a communication link between the user device and the server in accordance with a transmission control protocol for transmission of a data packet between the user device and the server, wherein the transmission protocol control proxy component
establishes a first TCP proxy communication link with the user device on behalf of the server;

establishes a second TCP proxy communication link with the server on behalf of the user device; and initiates a congestion avoidance protocol based on the established first and second TCP proxy communication links and eliminates a slow start phase of transmission control protocol;

transmitting the data packet to the user device utilizing the transmission control protocol and, at the same time, asynchronously transmit an acknowledgement indicative of a receipt of the data packet by the user device to the server, wherein transmission of an acknowledgement of a receipt of the data packet by the user device is configured to be suppressed at the user device; and preventing re-transmission of the data packet from the server to the user device upon the server failing to receive an acknowledgement from the user device within a predetermined period of time.

20. The computer program product according to claim 19, wherein an evolved node (eNodeB) base station performs at least one of the providing and the transmitting, the eNodeB base station comprising at least one processor and at least one memory.

21. The computer program product according to claim 19, wherein the operation further comprise sending to the server the acknowledgement indicating receipt of the data packet by the user device.

22. The computer program product according to claim 19, wherein the operation further comprise preventing transmission of multiple acknowledgements from the user device indicating receipt of the data packet by the user device.

23. The computer program product according to claim 19, wherein the operation further comprise sending to the server an acknowledgement indicating a receipt of the data packet by the user device upon receiving a confirmation that the data packet was received by the user device, the confirmation being generated by at least one of the media access control (MAC) layer of the user device and a radio link control (RLC) layer of the user device.

24. The computer program product according to claim 19, wherein the transmission control protocol proxy component includes at least one transmission control protocol optimization component configured to perform optimization of at least one transmission control protocol parameter.

25. The computer program product according to claim 24, wherein the user device includes a power source configured to power the user device for transmission and receiving of data from the base station; and the optimization of the at least one transmission control protocol parameter is configured to reduce consumption of power in the power source of the user device.

26. The computer program product according to claim 24, wherein the optimization of the at least one transmission control protocol parameter is configured to reduce consumption of physical uplink shared channel ("PUSCH") resources associated with a communications link between the user device and a base station comprising at least one processor and at least one memory.

27. The computer program product according to claim 24, wherein the optimization of the at least one transmission control protocol parameter is configured to reduce interference of an uplink communications link between the user device and a base station comprising at least one processor and at least one memory.

\* \* \* \* \*